United States Patent
Lammers et al.

(10) Patent No.: US 8,026,953 B2
(45) Date of Patent: Sep. 27, 2011

(54) METHOD FOR PROCESSING COLOR IMAGE DATA

(75) Inventors: Matheus Johannus Gerardus Lammers, Eindhoven (NL); Petrus Maria De Greef, Eindhoven (NL); Wei Pien Lee, Eindhoven (NL); Erik Boudewijn Van Der Tol, Eindhoven (NL); Michiel Adriaanszoon Klompenhouwer, Eindhoven (NL); Erno Hermanus Antonius Langendijk, Eindhoven (NL)

(73) Assignee: Samsung Electronics Co., Ltd. (KR)

( * ) Notice: Subject to any disclaimer, the term of this patent is extended or adjusted under 35 U.S.C. 154(b) by 552 days.

(21) Appl. No.: 11/568,713

(22) PCT Filed: May 4, 2005

(86) PCT No.: PCT/IB2005/051451
§ 371 (c)(1),
(2), (4) Date: Nov. 6, 2006

(87) PCT Pub. No.: WO2005/109854
PCT Pub. Date: Nov. 17, 2005

(65) Prior Publication Data
US 2007/0223018 A1    Sep. 27, 2007

(30) Foreign Application Priority Data
May 11, 2004   (EP) .................... 04102040

(51) Int. Cl.
*H04N 9/73* (2006.01)
*G03F 3/08* (2006.01)
*G06K 9/00* (2006.01)

(52) U.S. Cl. ............... 348/223.1; 348/225.1; 358/518; 358/519; 382/167

(58) Field of Classification Search .... 348/223.1–225.1; 358/1.9
See application file for complete search history.

(56) References Cited

U.S. PATENT DOCUMENTS

| | | | | |
|---|---|---|---|---|
| 5,539,540 A * | 7/1996 | Spaulding et al. | | 358/518 |
| 5,583,666 A | 12/1996 | Ellson et al. | | |
| 5,615,312 A * | 3/1997 | Kohler | | 358/1.9 |
| 5,870,069 A * | 2/1999 | Choh et al. | | 345/22 |
| 6,711,289 B1 | 3/2004 | Sakamoto | | |
| 7,064,864 B2 * | 6/2006 | Takahashi et al. | | 358/1.9 |
| 7,180,629 B1 * | 2/2007 | Nishio et al. | | 358/1.9 |
| 7,193,587 B2 * | 3/2007 | Yu et al. | | 345/63 |
| 2002/0196972 A1 | 12/2002 | Bayramoglu et al. | | |
| 2003/0067435 A1 | 4/2003 | Liu | | |
| 2003/0184565 A1* | 10/2003 | Georgiev | | 345/646 |
| 2005/0151728 A1* | 7/2005 | Nenonen | | 345/204 |
| 2005/0248784 A1* | 11/2005 | Henley et al. | | 358/1.9 |
| 2006/0072130 A1* | 4/2006 | DeBaer | | 358/1.9 |
| 2004/0239971 A1* | 12/2004 | Kim | | 358/1.9 |

FOREIGN PATENT DOCUMENTS

| | | |
|---|---|---|
| EP | 0488656 A | 6/1992 |
| EP | 1363462 | 11/2003 |
| JP | 06-253138 | 9/1994 |
| WO | 03083775 A | 10/2003 |
| WO | WO 03/083775 | * 10/2003 |

* cited by examiner

*Primary Examiner* — Sinh Tran
*Assistant Examiner* — Christopher K Peterson
(74) *Attorney, Agent, or Firm* — Innovation Counsel LLP (57) ABSTRACT

A method for processing color image data that enables to optimally render a color image on a target device. The method incorporates a color gamut mapping step, where the amount of gamut mapping is adapted dynamically, in dependence of at least a color saturation value of the input pixel. Preferably, also a luminance value of the input pixel is used. The adaptive gamut mapping incorporates correction of saturation, and preferably also hue and white point, of the image data. The color gamut of the target device is used to the fullest possible extent, while clipping and loss of local details in highly saturated areas of the input image is largely prevented.

15 Claims, 5 Drawing Sheets

METHOD FOR PROCESSING COLOR IMAGE DATA

The invention relates to a method for processing color image data to be displayed on a target device, such as an LCD panel for mobile applications.

The invention further relates to a display driver incorporating circuitry for processing color image data according to such a method, and to a computer program for carrying out the method.

It is well known in the art to drive a color display device with color image data, which is generated for example by a camera or a video processor and supplied to the display device for displaying an image thereon. The color image data may be processed in order to appeal as much as possible to a viewer watching the image. For example, increasing the color saturation of image data for this purpose has been known since the earliest television systems, where adapting the color saturation of the image data is usually implemented as a manual control.

Also, it is known to process color image data in such way that image rendering on certain target display devices is improved. For this purpose, U.S. Pat. No. 6,711,289 discloses a method of converting image data in RGB form. The saturation of every frame of image data is processed such, that the saturation value is not being changed for portions of the image data having a saturation value up to slightly below a predetermined threshold of saturation values capable of being rendered by the target display device. However, for image data having a saturation value equal to, or greater than said threshold, the saturation value is compressed in a non-linear way so as to render the image data reproducible by the target device.

However, it appears that for many target devices the result of converting image data using the above method is unsatisfactory. If the color rendering capabilities of the target device are relatively limited, as is the case for instance in an LCD panel used for mobile applications such as mobile phones, PDAs, or digital still cameras, a relatively large range of saturation values is compressed into a relatively limited number of colors on the target device. As a result, local details are lost in areas of the image having medium to high color saturation. These are output on the target device as flat areas of a saturated color, which is clearly undesirable.

It is an object of the invention to provide improved image rendering on devices having relatively limited color rendering capabilities, such as LCD panels for mobile applications.

This object has been achieved by means of the method according to the present invention as specified in independent Claim 1.

The present invention particularly relates to a method for processing color image data known as color gamut mapping. In this method, image data is processed by converting input pixel data from a source color gamut associated with said input pixel data to a target color gamut associated with the target device. As stated above, many types of target device have limited color rendering capabilities, i.e. the target color gamut generally has a limited size with respect to the original color gamut.

The processing method according to the invention operates directly on the color image data, that is, a pixel of the color image data is received and directly mapped into output pixel data to be displayed on the target device. Preferably, the mapping is carried out at pixel frequency, and thus every color pixel is directly processed after it has been received.

There is no need to collect and store an entire frame of image data as in U.S. Pat. No. 6,711,289. Thus, the method according to the invention is relatively cheap and efficient, as no memory is required for storing frames of display data.

Preferably, gamut mapping includes processing the input pixel data with an operator being defined by characteristics of the source and target color gamuts. This mapping operator is then adaptable in dependence of a color saturation value of the current input pixel. That is, the color saturation value of the incoming pixel is determined, and in dependence thereof, the strength of the color gamut mapping operation performed on that pixel is determined. This feature of the present invention will also be referred to as 'adaptive color gamut mapping' hereinafter.

For pixels having low color saturation (i.e. pixel colors close to white or grey) the full mapping operator as defined by characteristics of the source and target color gamuts is used, so that such a pixel is rendered on the target device with a mapped color being as close as possible to its intended color. The color saturation is thereby generally amplified. However, as the saturation value increases, using the full mapping operator would lead to an output pixel value outside the range of colors that can be displayed on the target device. Similarly to the prior art, such output pixel values would clip, resulting in large areas of flat saturated color and loss of local details.

Therefore, for increasing saturation values, the method according to the invention allows for reduced-strength color gamut mapping. For this purpose, the full mapping operator is adaptable in dependence of the color saturation value of the incoming pixel data.

Preferably, for highly saturated colors, no color gamut mapping is being carried out at all. For pixels having a highly saturated color value, the output pixel data is generally the same as the input pixel data. Therefore, adaptive color gamut mapping according to the invention does not lead to output pixel values outside the target color gamut. Clipping of output pixel values is prevented and local details are as high as possible throughout the image rendered on the target device. Details are better preserved in areas of highly saturated color.

The adaptive gamut mapping process preferably not only corrects the saturation of the pixel data, but simultaneously also the hue value of the pixel data. This is for example an advantage in state of the art display technology using three primary colors, as not all target devices have the same primary color points as the sRGB and EBU standards for graphics and video signals. In particular, displays for mobile applications often have a blue primary that is slightly greenish, in other words, the blue primary tends to cyan. In such displays, hue correction is especially important for images containing recognizable colors, such as human faces, green grass or a blue sky. Such colors should be rendered on the target device as naturally as possible. However, hue correction should not lead to image artifacts such as clipping.

By virtue of the invention, a hue correction can be performed for unsaturated input pixels, so that such pixels can be shown on the target display in a color as close as possible to their intended color.

Again, for increasing color saturation values, the amount of gamut mapping is reduced, to prevent output pixel values outside the target color gamut and loss of local details. Highly saturated input pixels are not processed, and are rendered near the color points of the target device. Such pixels are thus not corrected for hue, in order to prevent clipping artifacts.

In a preferred embodiment, the mapping operator is further adaptable in dependence of a luminance value of the input pixel data. The adaptive color gamut mapping process may then also allow for adaptive correction of the white point.

Not all target devices have the same white point as the D65 white point defined in the sRGB and EBU standards. It is known that bright, unsaturated pixels are perceived brighter when their color is made somewhat more bluish. For this reason, LCD panels for mobile applications often have a white point that is slightly blue as compared to the D65 white point.

For pixels having low luminance and low color saturation, thus grey pixels, the adaptive color gamut mapping ensures that the pixel is rendered on the target device with a color being as close as possible to the intended color. Thus, the white point can be corrected towards the D65 white point.

For pixels having relatively high luminance but low color saturation, for example a white pixel, the amount of gamut mapping is reduced or no gamut mapping is performed at all, so that a white pixel is rendered at the white point of the target device. Thus, the highest possible perceived luminance of such pixels is ensured.

For saturated pixels, the white point correction is not used, as such pixels are not relevant for the white point definition.

Thus, by virtue of the method according to the invention, gamut mapping can be performed on the incoming pixel data on the fly, so that the input pixel data may be adaptively corrected for saturation, and in preferred embodiments also for hue and white point. The target color gamut associated with the target device can be optimally used to render the incoming color image data, with local details that are as high as possible, even in areas having high color saturation.

The feature of the invention that the gamut mapping is adaptable in dependence of the color saturation value of the actual incoming pixel data largely prevents that the gamut mapping step results in an output pixel value outside the target color gamut. Thus, clipping of the output pixel data is prevented, and the associated loss of local details in saturated areas of the image on the target device is hardly observable anymore.

The method according to the invention can be implemented in hardware; preferably a display driver such as an LCD panel driver, for example the Philips PCF8833 or PCF8881, or an image processing chip, such as the Philips PNX4000 Nexperia mobile image processor, is provided with dedicated circuitry for performing adaptive color gamut mapping.

Alternatively, adaptive color gamut mapping can be carried out by a computer program. The computer program could be software to be loaded on a personal computer outputting video data to a target display device, but is preferably the firmware of a mobile device such as a mobile phone, a PDA or a digital camera.

The method will now be described and elucidated further with reference to the accompanying drawings. Herein.

Figure 1:
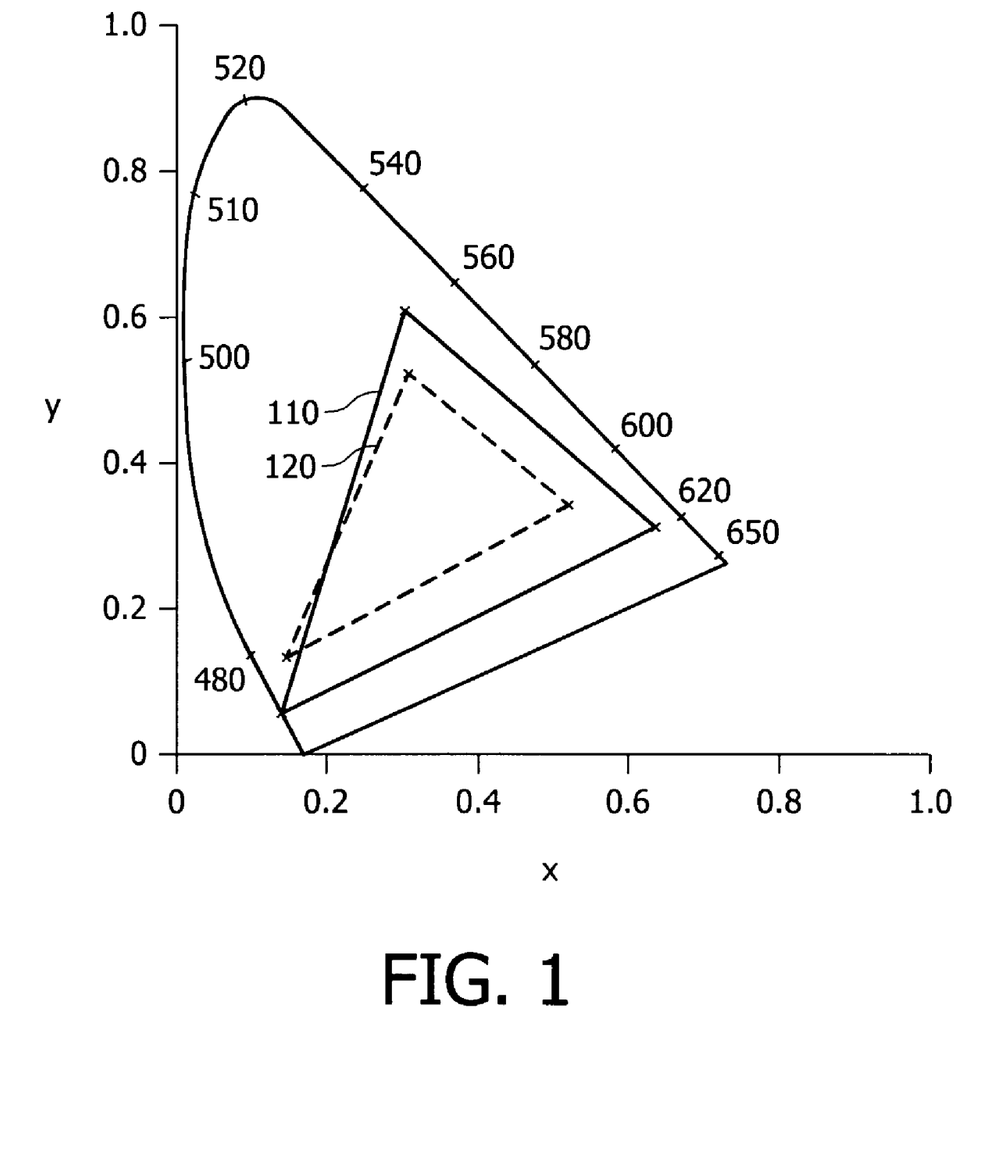
FIG. 1 shows an example of a source and target color gamut displayed in the CIE color space.

In FIG. 1, the CIE 1931 chromaticity diagram is shown. The diagram is a two-dimensional plot of colors of constant intensity based on the visual response of the CIE 1931 standard observer, which was determined by physiological measurements of human color vision. In the diagram, a source color gamut 110 and a target color gamut 120 are indicated. The source color gamut 110 corresponds to the EBU color triangle, and thus input pixel data is provided in the form of RGB image data. The target color gamut 120 corresponds to a typical color triangle associated with a mobile LCD display such as used in mobile phones.

It can be seen that the target color gamut 120 has a more limited size than the EBU color space, and thus the mobile LCD display cannot render all colors of the EBU color space properly. Mobile LCD displays generally have limited color rendering capability, due to the spectrum of the backlight used and the limited thickness of the color filters which is required to obtain sufficient transmission.

Without any processing of the image data, this leads to several artifacts in color reproduction on the display:

All colors are less saturated. For example, a human face rendered on the target display looks pale.

Most colors intended as blue are actually rendered as cyan. It is difficult to properly depict a blue sky.

Grey colors look bluish. This increases an overall paleness impression of the rendered image.

To reduce these problems, color gamut mapping can be applied, wherein the RGB input data is transformed into RGB output data better matching with the target color gamut. However, in this case severe clipping can occur, because the color gamut mapping operation may cause parts of the input image data to be transformed outside the actual target color gamut. This can be observed in the output image thus processed, by the presence of large 'flat' areas of saturated or bright colors and only little local detail.

The method according to the invention proposes to process the input pixel data by means of color gamut mapping adaptable in dependence of at least a color saturation value of said input pixel data. Preferably the color gamut mapping is also adaptable in dependence of a luminance value of the input pixel data.

On the basis of the actual input pixel value, the optimal strength of the color gamut mapping to be applied is determined. By performing such image processing, the input pixel data is rendered as close as possible to the intended color, without leading to clipping, as less correction is applied for saturated colors which would otherwise be mapped outside the target color gamut. The adaptive color gamut mapping allows the target color gamut associated with the target device to be used to the largest extent possible, while ensuring that a relatively large range of input colors can be rendered on the target device as intended.

In the remainder of this document, an embodiment of the method according to the invention is described with reference to the example color gamuts of FIG. 1. However, it should be clear that the method could easily be modified to provide an adaptive color gamut mapping processing from any one color gamut to any one target color gamut. It is particularly advantageous for target color gamuts being limited in size with respect to the original color gamut.

The mapping operator used in color gamut mapping is defined by characteristics of the source and target color gamuts. When processing is done, as in the present example, via the CIE color system, the mapping operator is defined by the x,y coordinates of the primary colors and the white point of the source and target color gamuts.

The input pixel data and output pixel data are generally in the form of RGB data, in this particular example 24-bit RGB data. In a known way, the RGB data can be transformed into XYZ data associated with the device-independent CIE color system by means of a 3×3 transformation matrix. Input RGB data is thus transformed into device-independent XYZ data by means of a matrix $M_{EBU}$ determined by the primary colors and white point as defined for the EBU color space, and output RGB data can similarly be transformed into device-independent XYZ data by means of a matrix $M_{dis}$ determined by the primary colors and white point of an exemplary mobile LCD panel.

The mapping operator M used in color gamut mapping can then also be expressed as a 3×3 matrix, and is obtained as follows:

$$M = (M_{dis})^{-1} \cdot M_{EBU} \qquad (1)$$

The color gamut mapping operation can then be represented as follows:

$$\begin{pmatrix} R \\ G \\ B \end{pmatrix}_{out} = M \begin{pmatrix} R \\ G \\ B \end{pmatrix}_{in} \qquad (2)$$

By means of this operation, input RGB pixel data $RGB_{in}$ is transformed into output RGB pixel data $RGB_{out}$ in such way, that the input pixel is rendered on the target device in a color as closely as possible to its intended color. As explained earlier, this operation may lead to severe clipping artifacts for saturated input colors, therefore according to the invention the input pixel data is instead processed with a matrix $M_A$ being dynamically calculated from the full color gamut mapping matrix M in dependence of the color saturation value and preferably also the luminance value of the actual input pixel data.

Figure 2:
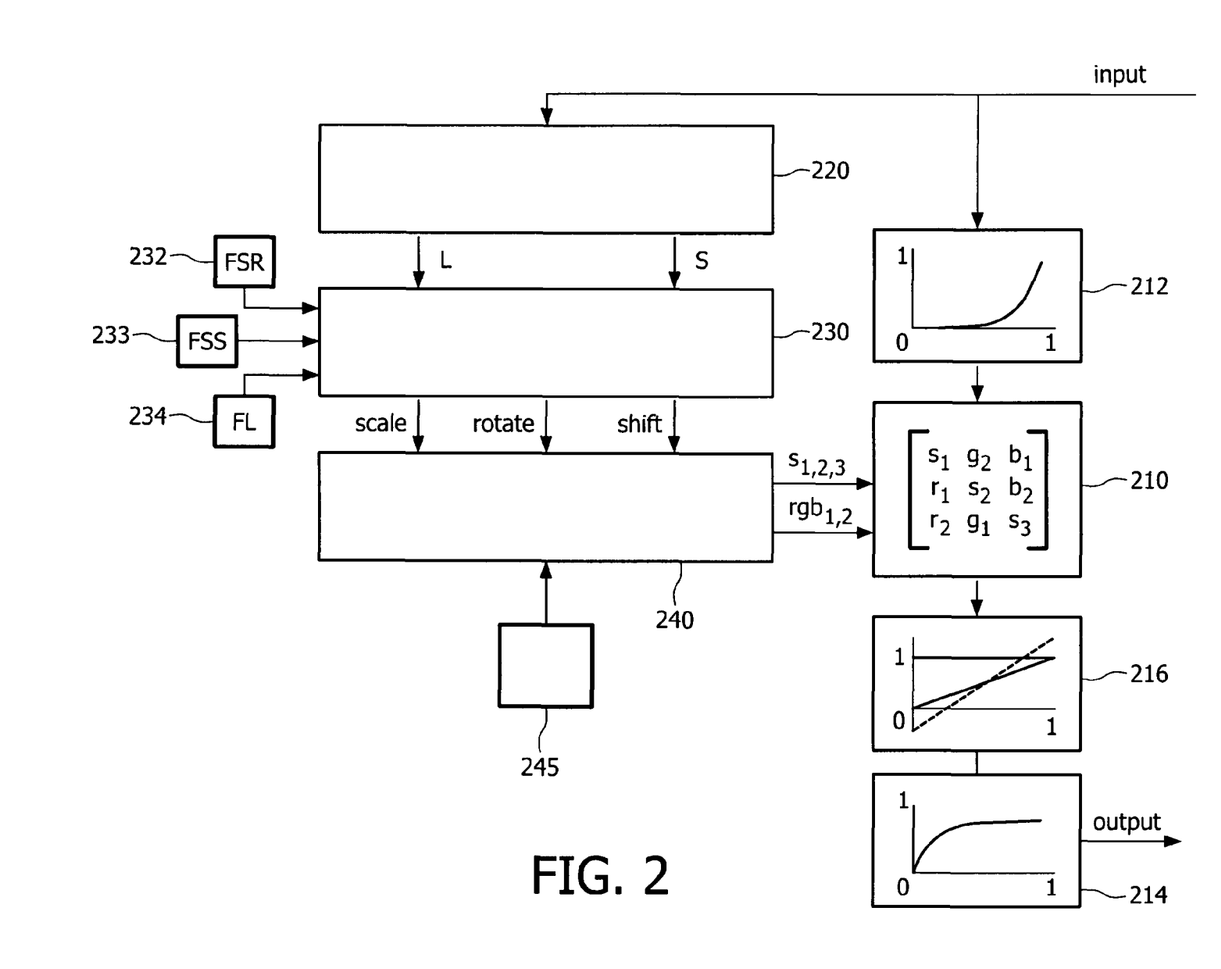
FIG. 2 is a block diagram representing a first embodiment of the method according to the invention.

A block diagram representing an embodiment of the method of the present invention is shown in FIG. 2.

The input pixel data $RGB_{in}$ is firstly processed by a gamma function 212, whereafter adaptive color gamut mapping is performed in block 210. That is, the input pixel data is processed with the adapted matrix $M_A$.

In block 220, a luminance value L and a color saturation value S for the current input pixel $RGB_{in}$ are determined. Different models can be used for this, however in the preferred embodiment, the luminance value L is the average of $R_{in}$, $G_{in}$ and $B_{in}$, and the saturation value S is a weighted average of the extremes of $R_{in}$, $G_{in}$ and $B_{in}$. Thus:

$$L = \frac{R_{in} + G_{in} + B_{in}}{3} \quad S = \frac{\max(RGB_{in}) - \min(RGB_{in})}{\max(RGB_{in}) + \min(RGB_{in})} \qquad (3)$$

These values are fed to block 230 used for generating three parameters scale, rotate and shift.

Parameter scale is equal to the value of a function FSS, stored in look-up table 233, corresponding to the color saturation value S. This parameter is used to adapt the amount of gamut mapping with respect to the adaptive saturation correction.

Parameter rotate is equal to the value of a function FSR, stored in look-up table 232, corresponding to the color saturation value S. This parameter is used to adapt the amount of gamut mapping with respect to the other correction parameters, thus adaptive hue correction and adaptive white point correction.

Similarly, parameter shift is equal to the value of a function FL, stored in look-up table 234, corresponding to the luminance value L. This parameter is only used to adapt the amount of white point correction carried out.

Generally, functions FL, FSS and FSR are chosen so as to allow full color gamut mapping up to certain threshold values for luminance and color saturation of the input pixel. That is, if the input pixel has a luminance L and a color saturation S which are both lower than the respective threshold values in functions FL, FSS and FSR, then the two parameters output by block 230 are equal to 1, and the matrix $M_A$ used for adaptive color gamut mapping is equal to the full matrix M.

Figure 3A:
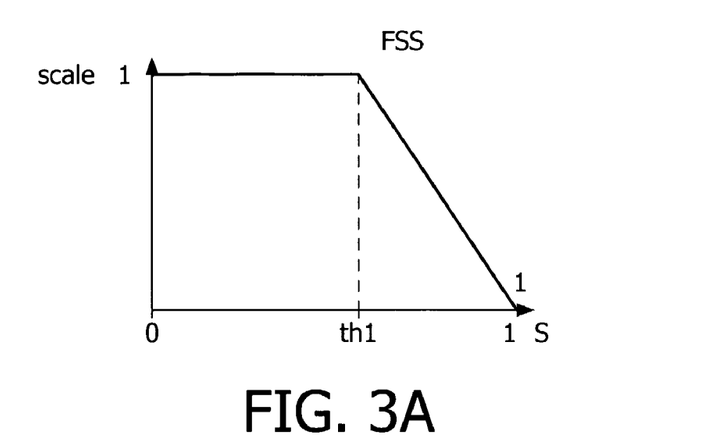
FIGS. 3A-3C represent saturation and luminance functions used in adapting the strength of color gamut mapping in the first embodiment.
Figure 3B:
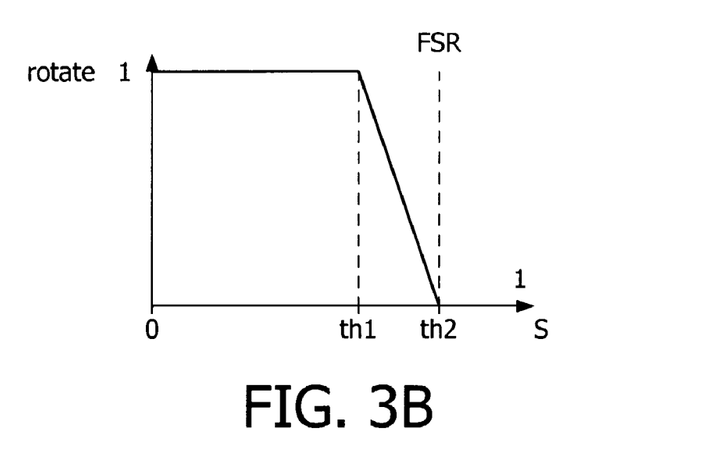

Particular examples of a suitable function FSS and FSR are depicted in FIGS. 3A and 3B respectively. For a certain saturation value S of the current pixel value, the parameter scale is equal to the value of function FSS and parameter rotate is equal to the value of function FSR. Below a first threshold th1, parameters scale and rotate are both equal to 1. Above the first threshold th1, parameter scale decreases linearly with saturation until it becomes 0 at maximum saturation, and parameter rotate decreases linearly with saturation until it becomes 0 at a second threshold value th2. Thus, in between the threshold values th1 and th2, parameter rotate decreases linearly with saturation, and above the second threshold th2, parameter rotate is equal to 0.

Threshold th1 represents the saturation value for the point on one of the sides of the target display color triangle that is closest to the target display white point. Thus, it is the largest value for which full color gamut mapping can be performed without the resulting output value ending up outside the target display color triangle. Threshold th2 represents the largest value of the distance between a target display primary color point and its white point, as compared to the distance between the corresponding EBU primary color point and white point. When the current saturation value is larger than th2, there is no longer a need to do any pixel processing.

Figure 3C:
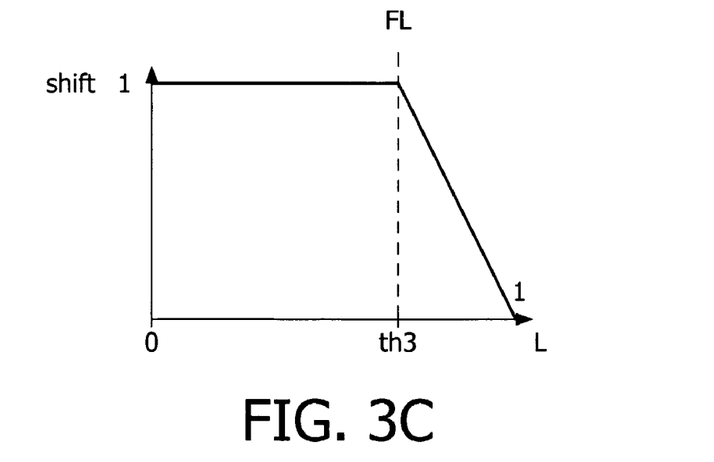

A particular example of a suitable function FL is depicted in FIG. 3C. The parameter shift is equal to the value of function FL for a certain luminance value of the current pixel. As is clear from the figure, the parameter shift is equal to 1 up to a luminance threshold value th3. For larger luminance values, thus bright pixels, the parameter decreases linearly with the luminance. Parameter shift is equal to 0 when the input pixel has maximum luminance, thus for a white pixel.

Figure 4:
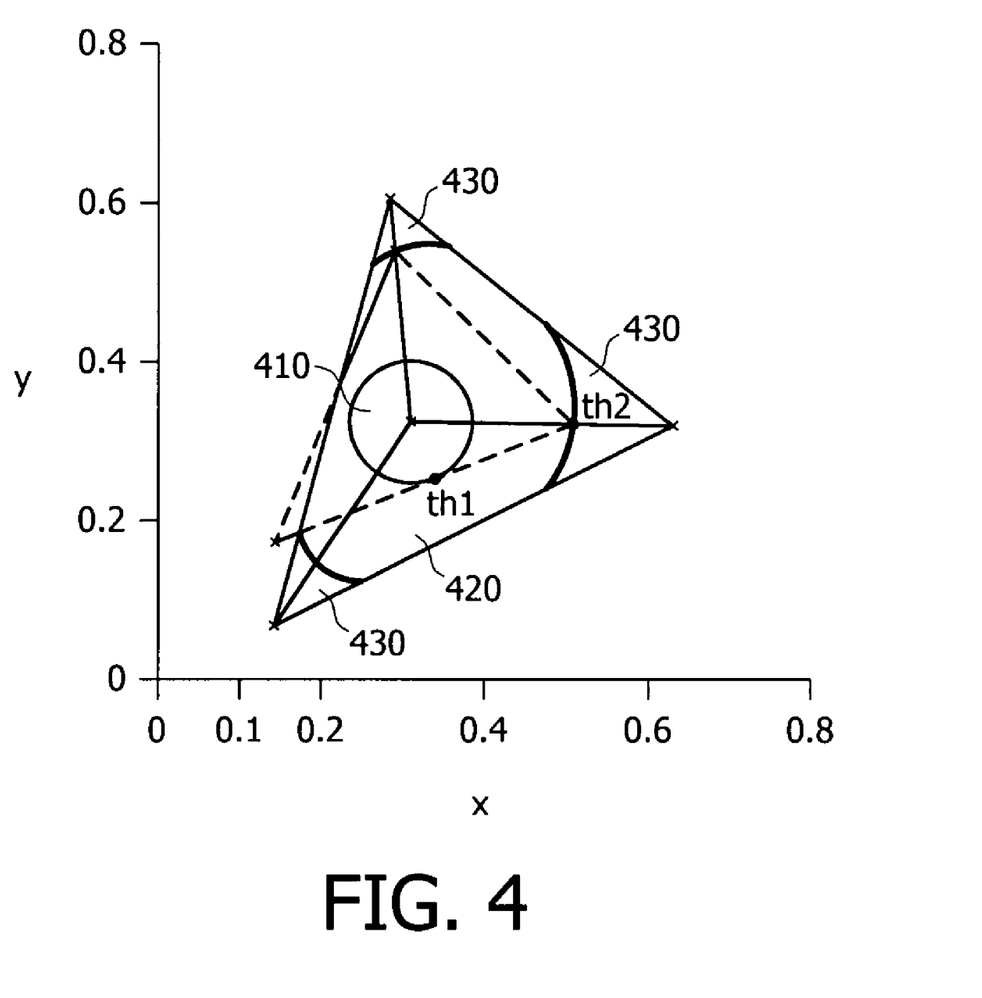
FIG. 4 shows which parts of the source color gamut are being processed in the first embodiment.

The positions of the thresholds th1 and th2 for the saturation function FSS and FSR are indicated in FIG. 4. In area 410, the input pixel data is fully corrected for hue and saturation. White point correction is also done in full, unless the luminance of the input pixel is above luminance threshold th3 as explained in the above. Similarly, in area 420, the input pixel data is partially corrected for both saturation and hue, and input pixels within area 430 are partly corrected for saturation only.

The dynamic calculation of matrix $M_A$ is performed in block 240, where the elements of said matrix are generated from the elements of matrix M, dynamically adapted in dependence of the three parameters scale, rotate and shift.

In more detail, calculation is done in such way that when scale, rotate and shift are all equal to 1, that is the pixel saturation is below threshold th1 and the pixel luminance is below threshold th3, the adapted matrix $M_A$ is equal to the full gamut matrix M. For a fully saturated pixel in one of the primary colors, i.e. in accordance with (3) L=1/3 and S=1, no processing is done at all and the adapted matrix $M_A$ should equal an unitary matrix. For a white pixel, for which L=1 and S=0, the adapted matrix $M_A$ operation should result in a white output pixel We write the elements of matrices M and $M_A$ as:

$$M = \begin{bmatrix} S_1 & G_2 & B_1 \\ R_1 & S_2 & B_2 \\ R_2 & G_1 & S_3 \end{bmatrix} \quad M_A = \begin{bmatrix} s_1 & g_2 & b_1 \\ r_1 & s_2 & b_2 \\ r_2 & g_1 & s_3 \end{bmatrix}$$

Thus, the elements of the measured matrix M are represented by capital letters, and the elements of the adapted matrix $M_A$ are represented by small letters.

From the elements of the measured matrix M, nine parameters are calculated: an average and a difference for each of the primary colors, thus $$avg_r = \frac{R_1 + R_2}{2} \quad avg_g = \frac{G_1 + G_2}{2} \quad avg_b = \frac{B_1 + B_2}{2}$$

$$diff_r = \frac{R_1 - R_2}{2} \quad diff_g = \frac{G_1 - G_2}{2} \quad diff_b = \frac{B_1 - B_2}{2}$$

and sum parameters for each of the matrix rows:

$$sum_r = S_1 + G_2 + B_1 - 1$$

$$sum_g = R_1 + S_2 + B_2 - 1$$

$$sum_b = R_2 + G_1 + S_3 - 1$$

The elements of matrix M, or more preferably the above parameters which are calculated from the elements of matrix M, are stored in block 245.

The original matrix M is based on a characterization of the target display, in particular measured values of its primary color points and white point. For example, these measurements are performed by a display manufacturer on a batch of displays. The display manufacturer can then use this matrix corresponding to the measured color and white points to calculate the above-mentioned average, difference and sum parameters and store these in block 245, so as to ensure optimal color rendering on this particular batch of displays.

The elements of the adapted matrix $M_A$ are then calculated from these nine parameters together with scale, rotate and shift as follows:

$$r_1 = \underline{avg_r} \cdot \text{scale} + \underline{dif_r} \cdot \text{rotate}$$
$$r_2 = \underline{avg_r} \cdot \text{scale} - \underline{dif_r} \cdot \text{rotate} \quad s_1 = 1 + \underline{sum_r} \cdot \text{shift} \cdot \text{rotate} - g_2 - b_1$$

$$g_1 = \underline{avg_g} \cdot \text{scale} + \underline{dif_g} \cdot \text{rotate}$$
$$g_2 = \underline{avg_g} \cdot \text{scale} - \underline{dif_g} \cdot \text{rotate} \quad s_2 = 1 + \underline{sum_g} \cdot \text{shift} \cdot \text{rotate} - r_1 - b_2$$

$$b_1 = \underline{avg_b} \cdot \text{scale} + \underline{dif_b} \cdot \text{rotate}$$
$$b_2 = \underline{avg_b} \cdot \text{scale} - \underline{dif_b} \cdot \text{rotate} \quad s_3 = 1 + \underline{sum_b} \cdot \text{shift} \cdot \text{rotate} - r_2 - g_1$$

The elements of $M_A$ thus calculated, i.e. $s_{1,2,3}$ and $rgb_{1,2}$, are input into block 210 and used for processing the RGB pixel data in accordance with formula (2).

After the adaptive color gamut mapping step, the output pixel data is processed by a hard clipper function 216. This clips a negative value for $R_{out}$, $G_{out}$ or $B_{out}$ to 0, and, assuming 24-bit RGB pixel data, a value for $R_{out}$, $G_{out}$ or $B_{out}$ larger than 255 to the latter value. However, in the method according to the invention, the number of pixels that still need to be clipped is substantially reduced as compared to the prior art.

Finally, the output pixel data is processed by a de-gamma function 214 and supplied to the target device.

EXAMPLE

The x,y coordinates in the CIE color space for the primary color points and D65 white point of the EBU standard are:

|  | x | y |
|---|---|---|
| Red | 0.6400 | 0.3300 |
| Green | 0.2900 | 0.6000 |
| Blue | 0.1500 | 0.0600 |
| D65 white | 0.3127 | 0.3290 |

The primary color points and white point of a target device, in this case an LCD panel for a mobile device, are measured. Their x,y coordinates in the CIE color space are:

|  | x | y |
|---|---|---|
| Red | 0.5241 | 0.3302 |
| Green | 0.3049 | 0.5261 |
| Blue | 0.1521 | 0.1598 |
| White | 0.2886 | 0.3330 |

From these coordinates, the measured matrix M for gamut mapping of RGB data from the EBU color gamut to the display color gamut is calculated:

$$M = \begin{bmatrix} 1.454 & -0.279 & 0.244 \\ -0.108 & 1.336 & -0.354 \\ -0.112 & -0.114 & 1.153 \end{bmatrix}$$

This leads to the following values for the average, difference and sum parameters:

| | | |
|---|---|---|
| $avg_r = 0.110$ | $diff_r = 0.002$ | $sum_r = 0.418$ |
| $avg_g = -0.197$ | $diff_g = -0.082$ | $sum_g = -0.125$ |
| $avg_b = -0.055$ | $diff_b = 0.299$ | $sum_b = -0.073$ |

In this example, functions FSS, FSR and FL as shown in FIG. 3A-3C are used. Using the coordinates and matrix M stated above, the thresholds th1, th2 and th3 can now be calculated.

In FIG. 4, it can be observed that the point on one of the sides of the target display color triangle that is closest to the target display white point is on the Blue-Red axis. Using the coordinate data of the target display given above, it can be calculated that this point has coordinates x=0.349, y=0.250. The corresponding saturation value S is 0.564, which is used as the first threshold th1.

Also in FIG. 4, it can be observed that the largest value of the distance between a target display primary color point and its white point, as compared to the distance between the corresponding EBU primary color point and white point, occurs for the red primary. Thus, the red primary color relatively has the highest saturation as compared to the definition of the primary color points in the EBU standard. The target display's red primary point has coordinates x=0.524, y=0.330, and its corresponding saturation value S is 0.805, which value is used as the second threshold th2.

In the model used here, the third threshold th3 is calculated as follows:

$$th_3 = L_{max} = \left(\frac{1}{1.419}\right)^{\frac{1}{2.2}} = 0.853$$

wherein 1.419 is the highest row sum of matrix M and 2.2 is the gamma factor.

For a few RGB input pixels, the output pixel value resulting after adaptive color gamut mapping according to the above example will now be given and explained upon. It is noted that the red, green and blue sub-pixel values are normalized, that is, the maximum values of red, green and blue are equal to 1. Unsaturated red, green and blue sub-pixels are indicated by fractional values.

a) unsaturated blue pixel $(R,G,B)_{in} = (0, 0, 0.3)$

Using equation (3), it results that the saturation S=0.3 and the luminance L=0.1. These values are below all thresholds, so that scale=1, rotate=1 and shift=1.

It follows that $(R,G,B)_{out} = (0.072, 0, 0.329)$. It can be seen that saturation of the pixel is increased, and hue is corrected such that some red is added to this pixel. The result is a more natural looking blue color. Note that, in the above example, $G_{out}$ is in fact a negative number, so that $G_{out}$ has been clipped to 0.

b) saturated blue pixel $(R,G,B)_{in} = (0, 0, 1)$

The saturation S=1 and the luminance L=0.333.

The saturation value is larger than both the first threshold th1 and the second threshold th2, however the luminance is below the third threshold th3. Therefore, since scale=0 and rotate=0, it can easily be seen that $(R,G,B)_{out} = (0, 0, 1)$. This pixel is not processed and is rendered at the blue primary color point of the target display.

c) dark grey pixel $(R,G,B)_{in} = (0.3, 0.3, 0.3)$

Again the saturation and luminance values are below all thresholds, so that scale=1, rotate=1 and shift=1. The resulting output pixel $(R,G,B)_{out} = (0.425, 0.263, 0.278)$. A white point correction has been carried out wherein the contribution of green and blue to this grey pixel was reduced in favor of an increase contribution of red. This prevents a bluish rendering of grey pixels and reduces an overall paleness impression.

d) white pixel $(R,G,B)_{in} = (1, 1, 1)$

The saturation S=0 and the luminance L=1, thus scale=1, rotate=1 and shift=0. The sum parameters therefore do not contribute to the output pixel value, and the average and difference parameters cancel each other out in such way that the resulting output pixel is white again, $(R,G,B)_{out} = (1, 1, 1)$.

Figure 5:
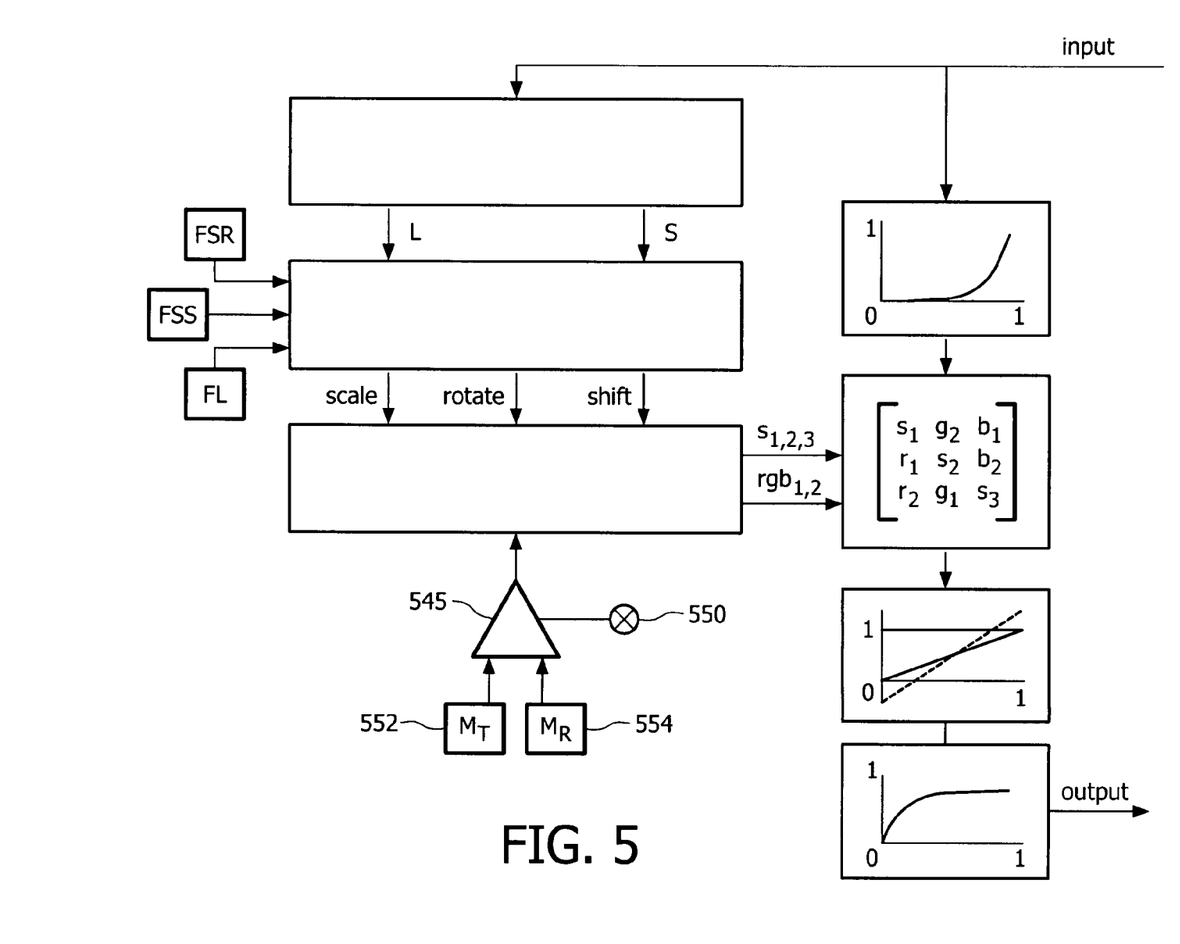
FIG. 5 is a block diagram representing a second embodiment of the method according to the invention.

The second embodiment in FIG. 5 is identical to the first embodiment, with the exception of block 245 storing the full gamut mapping matrix M. This has been replaced by a mixer 545 connected to a light sensor 550, a block 552 storing a first matrix $M_T$ and a block 554 storing a second matrix $M_R$.

This embodiment is for example advantageous for use with a transflective LCD panel. The first matrix is then characterized by the reflective primary color points and white point of the LCD panel, and the second matrix is then characterized by the transmissive primary color points and white point of the LCD panel.

When the ambient light level is low, a viewer mainly observes the transmissive mode of the LCD and thus, the mixer 545 arranges that matrix M is equal to the second matrix $M_T$. However, under bright ambient light such as direct sunlight, a viewer mainly observes the reflective mode of the LCD and thus, the mixer 545 arranges that matrix M is equal to the first matrix $M_R$. In intermediate light conditions, such as occur outdoors under a cloudy sky, the mixer 545 generates a matrix M with values in between those of the first matrix $M_R$ and those of the second matrix $M_T$. The ambient light level is detected by light sensor 550 and passed on to the mixer 545.

Alternatively, the different matrices stored in blocks 552 and 554 could correspond to different white points. For example, a first matrix may be calculated using a cool white point, e.g. 8500 K, and a second matrix may be calculated using a warn white point, e.g. 5000 K. The mixer 545 should then not be coupled to a light sensor, but to a user control, so that the viewer can control the white point and thus adapt the image rendered on the target device to his personal preference. When the adaptive color gamut mapping is implemented in software in the firmware of a mobile device, the user control is preferably arranged as a menu option in the user menu.

The user setting for white point is supplied to the mixer 545, which generates matrix M in accordance with this white point from the first matrix in block 552 and the second matrix in block 554.

The drawings are schematic and not drawn to scale. While the invention has been described in connection with preferred embodiments, it should be understood that the protective scope of the invention is not limited to the embodiments described herein. Rather, it includes all variations which could be made thereon by a skilled person, within the scope of the appended claims.

In summary, a method for processing color image data is presented that enables to optimally render a color image on a target device. The method incorporates a color gamut mapping step, where the amount of gamut mapping is adapted dynamically, in dependence of at least a color saturation value of the input pixel. Preferably, also a luminance value of the input pixel is used. The adaptive gamut mapping incorporates correction of saturation, and preferably also hue and white point, of the image data. The color gamut of the target device is used to the fullest possible extent, while clipping and loss of local details in highly saturated areas of the input image is largely prevented.

The invention claimed is:

1. A method for processing color image data to be displayed on a target device, the method comprising:

receiving input pixel data within a source color gamut, and mapping said input pixel data from said source color gamut to a target color gamut associated with said target device, the amount of mapping being adapted dynamically, at least partially according to a color saturation value of said input pixel data and a luminance value of said input pixel data, wherein the target color gamut has a limited size with respect to the source color gamut, wherein the mapping further comprises:

generating a scale parameter, a rotate parameter and a shift parameter at least partially according to the color saturation value and the luminance value; and performing the mapping at least partially according to the scale parameter, the rotate parameter, and the shift parameter;

wherein:

the scale parameter is determined as a function of the color saturation value, and corrects for a saturation of the output pixel data;

the rotate parameter is determined as a function of the color saturation value, and corrects for a hue and a white point of the output pixel data; and the shift parameter is determined as a function of the luminance value, and corrects for a white point of the output pixel data;

wherein the mapping further comprises mapping the color saturation value and a hue value of said input pixel data;

wherein the amount of the mapping of the color saturation value and the hue value is substantially uniform when the hue value is less than a first threshold, and generally linearly decreases when the hue value is greater than the first threshold; and wherein the first threshold is a hue value corresponding to a point closest to the target display white point on one side of a target display color triangle.

2. The method of claim 1, wherein the method is repeated at pixel frequency.

3. The method of claim 1, wherein the mapping includes modifying the hue value of the input pixel data.

4. The method of claim 1, wherein the mapping includes a white point correction of the input pixel data.

5. The method of claim 4, wherein the predetermined color gamuts are associated with different white points.

6. The method of claim 1, wherein the mapping includes processing said input pixel data with a mapping operator being defined by characteristics of the source and target color gamuts, the mapping operator being adaptable in dependence of a color saturation value of said input pixel data.

7. The method of claim 1, wherein the mapping operator is further adaptable in dependence of a luminance value of said input pixel data.

8. The method of claim 6, wherein the mapping operator is representable by a 3×3 matrix transforming input RGB pixel data into output RGB pixel data via the device-independent CIE color space.

9. The method of claim 1, wherein the source color gamut is the EBU color space.

10. The method of claim 1, further comprising composing the target color gamut from a plurality of predetermined color gamuts.

11. The method of claim 10, wherein the LCD panel is a transflective LCD panel, and the target color gamut is composed from a first color gamut associated with a reflective mode of the transflective LCD panel and a second color gamut associated with a transmissive mode of the transflective LCD panel, in dependence of an ambient light level.

12. The method of claim 1, wherein the target device is an LCD panel for mobile applications.

13. A display driver comprising circuitry for processing color image data to be displayed on a target device, the display driver comprising:
a processor to receive input pixel data within a source color gamut, and map said input pixel data from said source color gamut to a target color gamut associated with said target device, the amount of mapping being adapted dynamically, at least partially according to a color saturation value of said input pixel data and a luminance value of said input pixel data, wherein the target color gamut has a limited size with respect to the source color gamut,
the processor further configured for generating a scale parameter, a rotate parameter and a shift parameter at least partially according to the color saturation value and the luminance value, and performing the mapping at least partially according to the scale parameter, the rotate parameter, and the shift parameter;
wherein the scale parameter is determined as a function of the color saturation value, and corrects for a saturation of the output pixel data;
the rotate parameter is determined as a function of the color saturation value, and corrects for a hue and a white point of the output pixel data; and
the shift parameter is determined as a function of the luminance value, and corrects for a white point of the output pixel data,
wherein the processor is further configured to map the color saturation value and a hue value of said input pixel data;
wherein the amount of the mapping of the color saturation value and the hue value is substantially uniform when the hue value is less than a first threshold, and generally linearly decreases when the hue value is greater than the first threshold; and
wherein the first threshold is a hue value corresponding to a point closest to the target display white point on one side of a target display color triangle.

14. A display device including a display driver according to claim 13.

15. A non-transitory computer readable storage medium comprising a computer program including a set of instructions executable by a processor, the medium comprising:
code for receiving input pixel data within a source color gamut, and
code for mapping of said input pixel data from said source color gamut to a target color gamut associated with said target device, the amount of mapping being adapted dynamically, at least partially according to a color saturation value of said input pixel data and a luminance value of said input pixel data, wherein the target color gamut has a limited size with respect to the source color gamut,
code for generating a scale parameter, a rotate parameter and a shift parameter at least partially according to the color saturation value and the luminance value, and performing the mapping at least partially according to the scale parameter, the rotate parameter, and the shift parameter, wherein
the scale parameter is determined as a function of the color saturation value, and corrects for a saturation of the output pixel data;
the rotate parameter is determined as a function of the color saturation value, and corrects for a hue and a white point of the output pixel data; and
the shift parameter is determined as a function of the luminance value, and corrects for a white point of the output pixel data:
wherein the mapping further comprises mapping the color saturation value and a hue value of said input pixel data;
wherein the amount of the mapping of the color saturation value and the hue value is substantially uniform when the hue value is less than a first threshold, and generally linearly decreases when the hue value is greater than the first threshold; and
wherein the first threshold is a hue value corresponding to a point closest to the target display white point on one side of a target display color triangle.

* * * * *